United States Patent
Sinha

(10) Patent No.: US 9,445,254 B2
(45) Date of Patent: *Sep. 13, 2016

(54) ASSISTED DEVICE DISCOVERY

(71) Applicant: Broadcom Corporation, Irvine, CA (US)

(72) Inventor: Rajesh Kumar Sinha, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/830,672

(22) Filed: Aug. 19, 2015

(65) Prior Publication Data

US 2015/0358805 A1    Dec. 10, 2015

Related U.S. Application Data

(63) Continuation of application No. 13/941,323, filed on Jul. 12, 2013, now Pat. No. 9,119,022.

(60) Provisional application No. 61/835,911, filed on Jun. 17, 2013.

(51) Int. Cl.
  *H04W 8/00* (2009.01)
  *H04W 84/12* (2009.01)
  *H04W 88/06* (2009.01)
  *H04W 92/18* (2009.01)

(52) U.S. Cl.
  CPC ........... *H04W 8/005* (2013.01); *H04W 84/12* (2013.01); *H04W 88/06* (2013.01); *H04W 92/18* (2013.01)

(58) Field of Classification Search
  CPC ... H04W 8/005; H04W 84/12; H04W 88/06; H04W 92/18
  See application file for complete search history.

(56) References Cited

U.S. PATENT DOCUMENTS

| | | | |
|---|---|---|---|
| 6,526,034 B1 | 2/2003 | Gorsuch | |
| 8,838,135 B2 | 9/2014 | Moshfeghi | |
| 9,119,022 B2* | 8/2015 | Sinha | H04W 8/005 |
| 2005/0255892 A1 | 11/2005 | Wong et al. | |

OTHER PUBLICATIONS

IEEE Std 802.11ad—2012; Part 11: Wireless LAN Medium Access Control (MAC) and Physical Layer (PHY) Specifications; Amendment 3: Enhancements for Very High Throughput in the 60 GHz Band, IEEE Computer Society, Oct. 19, 2012; pp. 1-628.

* cited by examiner

*Primary Examiner* — Mohammad Anwar
(74) *Attorney, Agent, or Firm* — Brinks Gilson & Lione

(57) ABSTRACT

An electronic device may communicate according to a first communication standard and a second communication standard. The first communication standard may have a longer communication range than the second communication standard. The electronic device may send a capability indication through the first communication standard. The capability indication may indicate the electronic device is capable of communicating according to the second communication standard with a shorter communication range than the first communication standard. The electronic device may discover a second electronic device capable of communicating according to the second communication standard and positioned outside of a non-extended communication range of the second communication standard. Upon discovery, the electronic device may communicate with the second electronic device at an extended range of the second communication standard even though the second electronic device is positioned outside the non-extended communication range of the first electronic device.

20 Claims, 9 Drawing Sheets

ASSISTED DEVICE DISCOVERY

CROSS REFERENCE TO RELATED APPLICATIONS

This application is a continuation of U.S. patent application Ser. No. 13/941,323, filed Jul. 12, 2013, entitled "Assisted Device Discovery," which claims priority to provisional application Ser. No. 61/835,911, entitled "Assisted Device Discovery," and filed on Jun. 17, 2013, both of which are incorporated herein by reference in their entirety.

TECHNICAL FIELD

This disclosure relates to electronic devices. This disclosure also relates to discovery of electronic devices.

BACKGROUND

Continual development and rapid improvement in modern technology has resulted in the widespread availability and use of electronic devices, including mobile or portable communication devices. Consumers continue to demand and purchase electronic devices with additional capabilities. Consequently, electronic device and component manufacturers are continually developing additional communication features to support inter-device communication at increased speeds and efficiency.

DETAILED DESCRIPTION

The techniques and systems described below may facilitate an increased communication range for discovering devices capable of communicating in a particular communication mode, protocol, or standard.

Figure 1:
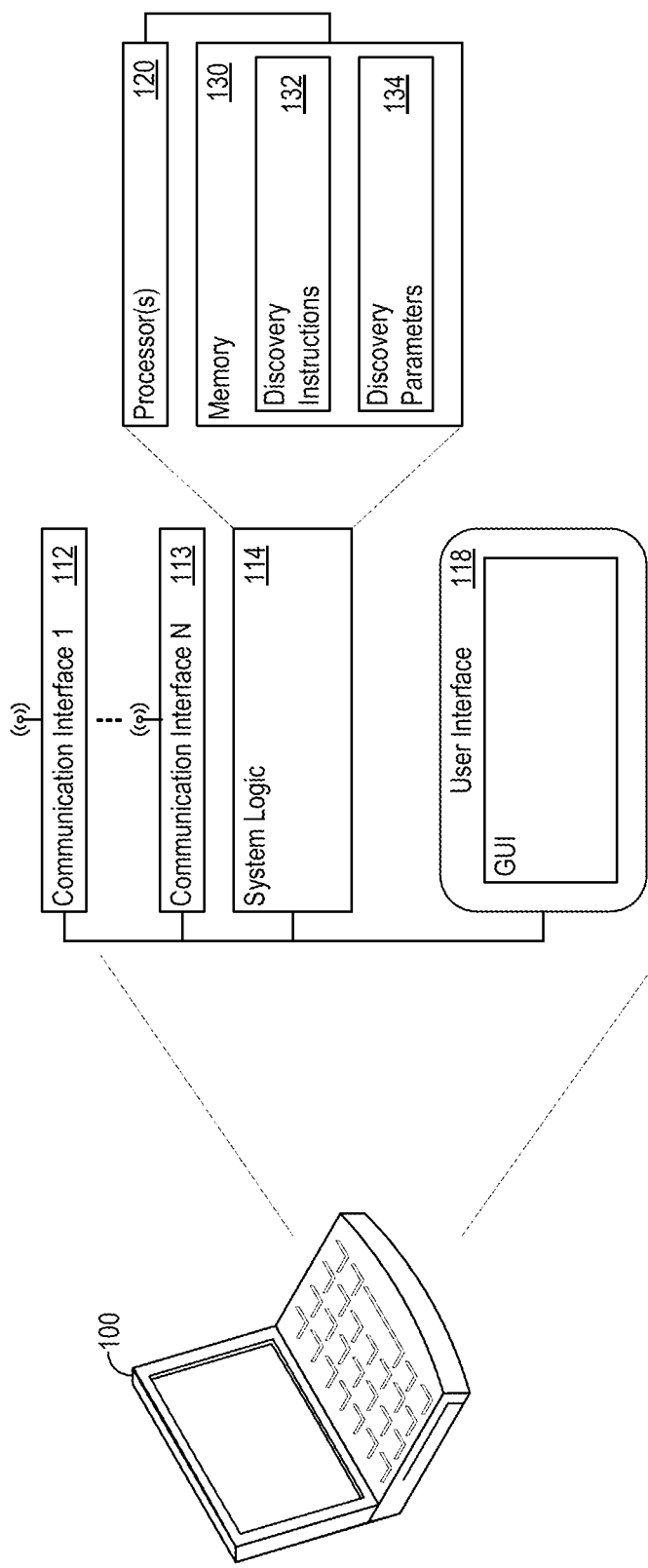
FIG. 1 shows an example of an electronic device that implements assisted device discovery.

FIG. 1 shows an example of an electronic device 100 that implements assisted device discovery. The electronic device 100 may include any device that communicates data. In FIG. 1, the electronic device 100 is a laptop computer. Other examples of electronic devices include a desktop computer, or other type of computer, a personal data assistant, mobile communication device, cellular phone, tablet device, portable electronic reader, or a portable email device. Additional examples of electronic devices include televisions, stereo equipment such as amplifiers, pre-amplifiers, and tuners, home media devices such as compact disc (CD)/digital versatile disc (DVD) players, set top boxes, portable MP3 players, high definition (e.g., Blu-Ray™ or DVD audio) media players, or home media servers. The electronic devices may include networking devices such as any type of communication modem (e.g., digital subscriber line (DSL) or cable), a network router, a network hub, a bridge, a switch, any type of gateway device, a server, and more. The electronic devices may be found in virtually any context, including the home, business, public spaces, or automobile. Thus, as additional examples, the electronic devices may further include automobile engine controllers, audio head ends or DVD players, satellite music transceivers, noise cancellation systems, voice recognition systems, climate control systems, navigation systems, alarm systems, or other devices.

The electronic device 100 may include any number of communication interfaces. In FIG. 1, the electronic device 100 includes N number of communication interfaces, two of which are labeled communication interface 1 112 and communication interface N 113. A communication interface may be configured to communicate according to one or more communication modes, e.g., according to various communication techniques, standards, protocols, or across various networks or topologies. The communication interfaces may support communication according to particular quality-of-service (QoS) techniques, encoding formats, through various physical (PHY) interfaces, and more. For example, a communication interface may communicate according to any of the following network technologies, topologies, mediums, or standards: Ethernet, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, Universal Mobile Telecommunications System (UMTS), GSM (R) Association, Long Term Evolution (LTE) (TM), or more), WiFi (including 802.11 a/b/g/n/ac), WiMAX, Bluetooth, WiGig (e.g., 802.11ad), and others. The electronic device 100 may simultaneously communicate across any number of networks using the communication interfaces 1-N.

In some implementations, a communication interface in the electronic device 100 supports a particular communication mode, e.g., communication across a particular communication standard. In that regard, the communication interface may include transceiver circuitry, modulation/demodulation circuitry, digital to analog converters (DACs), analog to digital converters (ADCs), filters, waveform shapers, pre-amplifiers, power amplifiers, software, and/or other logic for transmitting and receiving through one or more antennas or through a physical (e.g., wireline) medium over the particular communication standard. As one implementation, the electronic device 100 may include multi-band communication circuitry, including as examples communication interfaces that support wireless communication over the 2.4 GigaHertz (GHz) spectrum and/or 5.0 GHz spectrum according to any of the 802.11a, b, g, or n standards as well as a communication interface that supports wireless communication over the 60 GHz spectrum according to the 802.11ad standard.

The electronic device 100 includes system logic 114 and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the electronic device 100. In that regard, the system logic 114 may include logic that facilitates, as examples, running applications; accepting user inputs; saving and retrieving application data; establishing, maintaining, and terminating wired or wireless network connections, Bluetooth connections, connections with other devices, or other connections; and displaying relevant information on the user interface 118. The user interface 118 may include a graphical user interface, touch sensitive display, voice or facial recognition inputs, buttons, switches, speakers and other user interface elements.

The system logic 114 may include one or more processors 120 and memories 130. The memory 130 stores, for example, discovery instructions 132 that the processor 120 executes to carry out any of the processing or control functionality described below, operating in communication with the circuitry in the communication interfaces, such as communication 1 112 and communication interface N 113. The discovery parameters 134 provide and specify configuration and operating options for the discovery instructions 132. As discussed in greater detail below, the system logic 114 may perform assisted device discovery using a first communication mode to discover a different electronic device capable of communicating in second communication mode. The system logic 114 may discover the different electronic device beyond a supported discovery range, e.g., distance, of the second communication mode.

Figure 2:
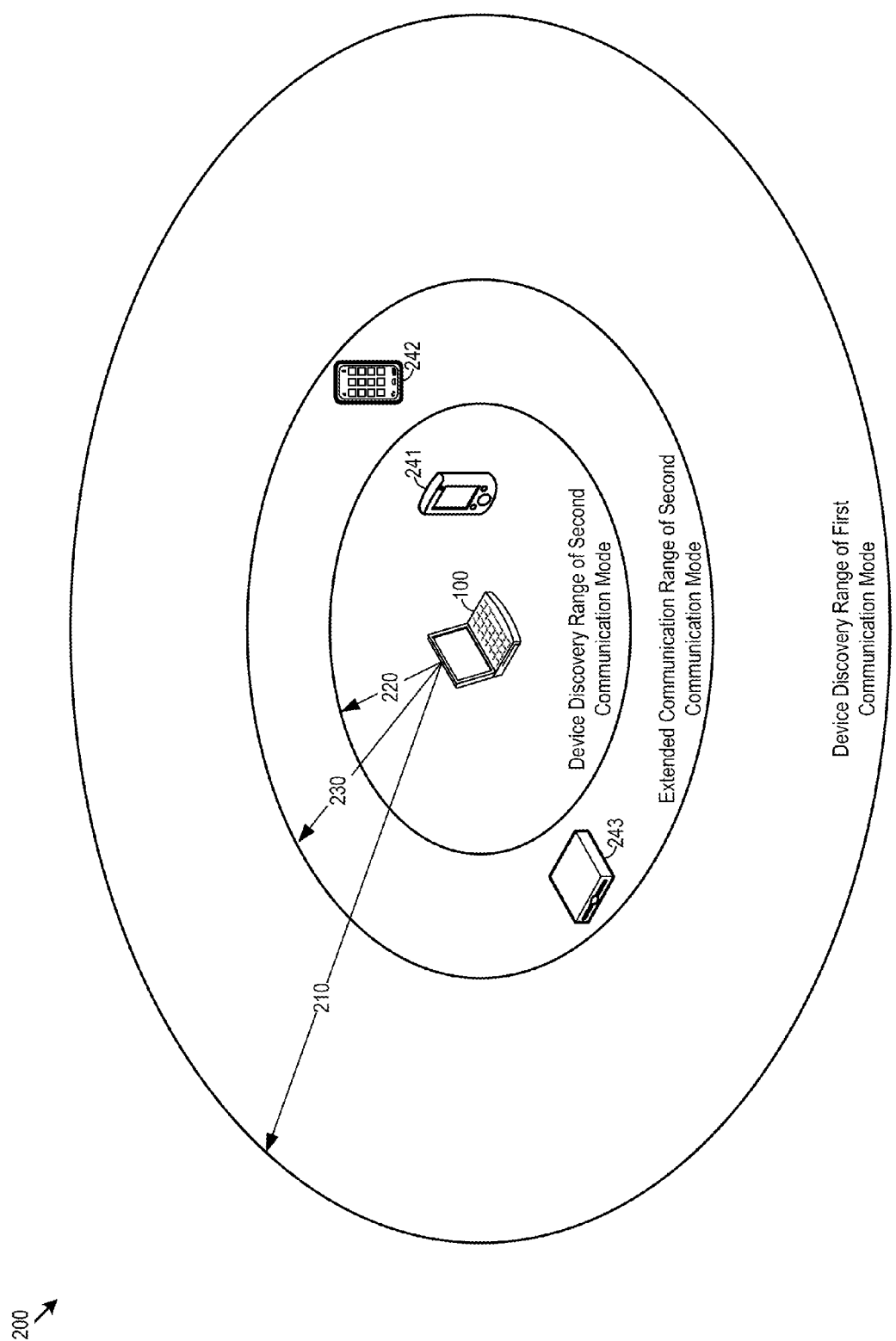
FIG. 2 shows example communication ranges of the electronic device.

FIG. 2 shows example communication ranges 200 of the electronic device 100. In the example shown in FIG. 2, the electronic device 100 may communicate according to a first communication mode and a second communication mode. The electronic device 100 may discover and communicate with other electronic devices capable of communicating in the second communication mode, such as the tablet device 241, the mobile phone 242, and the set top box 243.

The communication interfaces of the electronic device 100 may support simultaneous communication in the first and second communication modes. The first communication mode has a device discovery range of a distance 210, and the electronic device 100 may discover other electronic devices using the first communication mode when the other electronic devices are within an area surrounding the electronic device 100 labeled in FIG. 2 as the device discovery range of the first communication mode. Device discovery range may refer to a normal or non-extended communication range for a communication mode, standard, or protocol, e.g., the communication range of the communication mode, standard, or protocol when a range extension technique has not been performed.

The second communication mode through which the electronic device 100 may communicate has a device discovery range of a distance 220, which is lesser (e.g., shorter) than the communication range (e.g., the distance 210) for the first communication mode. Accordingly, the electronic device 100 may discover other electronic devices using the second communication mode when the other electronic devices are within an area surrounding the electronic device 100 labeled in FIG. 2 as the device discovery range of the second communication mode. In FIG. 2, the electronic device 100 may discover the tablet device 241 using the second communication mode as the tablet device 241 is positioned within the device discovery range of the second communication mode. The electronic device 100 may be unable to discover the mobile phone 242 or the set top box 243 using the second communication mode, as these devices are positioned outside of the device discovery range of the second communication mode.

The second communication mode may support an extended communication range of a distance 230. For instance, upon or after discovery of another electronic device capable of communicating according to the second communication mode, the electronic device 100 and the other electronic device may perform any number of range extension techniques to increase the range through which the electronic device 100 and other electronic device communicate in the second communication mode. The electronic device 100 may, for example configure any number of communication circuitry to extend the communication range of the second communication mode. One example of a range extension technique is beamforming, and support for one example of beamforming is defined within the PHY and Media Access Control (MAC) layers of the Institute of Electrical and Electronics Engineers (IEEE) 802.11ad standard, which is incorporated herein in its entirety. Beamforming techniques may employ directional antennas to reduce interference and focus the signal between two electronic devices into a concentrated "beam," allowing for faster data transmission over longer distances. The electronic device 100 may employ any other technique for increasing the communication range of the second communication mode, such as by increasing the transmit power of communications sent in the second communication mode. After performing range extension, the electronic device 100 may communicate with the other electronic device in the second communication mode at the extended communication range of the second communication mode, as labeled in FIG. 2.

Range extension may be dependent upon discovery of the other electronic device. That is, the electronic device 100 may perform range extension with the other electronic device after or concurrent to the discovery of the other electronic device.

The electronic device 100 performs assisted device discovery to discover other electronic devices capable of communicating across the second communication mode. In doing so, the electronic device 100 may support communication with other electronic devices in the second communication mode even when the other electronic devices are outside of the device discovery range of the second communication mode, e.g., the mobile phone 242 and the set top box 243 outside of the device discovery range of the second communication mode for the electronic device 100. By performing assisted device discovery, the electronic device 100 may effectively extend the range by which the electronic device 100 discovers other electronic devices capable of communicating in the second communication mode beyond the device discovery range of the second communication mode.

The electronic device 100 discovers other electronic devices capable of communicating in the second communication mode using communications sent through the first communication mode. In that way, the electronic device 100 extends the range of discovering devices capable of communicating in the second communication mode to the device discovery range of the first communication mode. The electronic device 100 may also perform range extension communications for the second communication mode with the other electronic devices using the first communication mode. After discovery and range extension of the second communication mode using the first communication, the electronic device 100 may communicate with the other electronic device in the second communication mode and at the extended communication range of the second communication mode.

Figure 3:
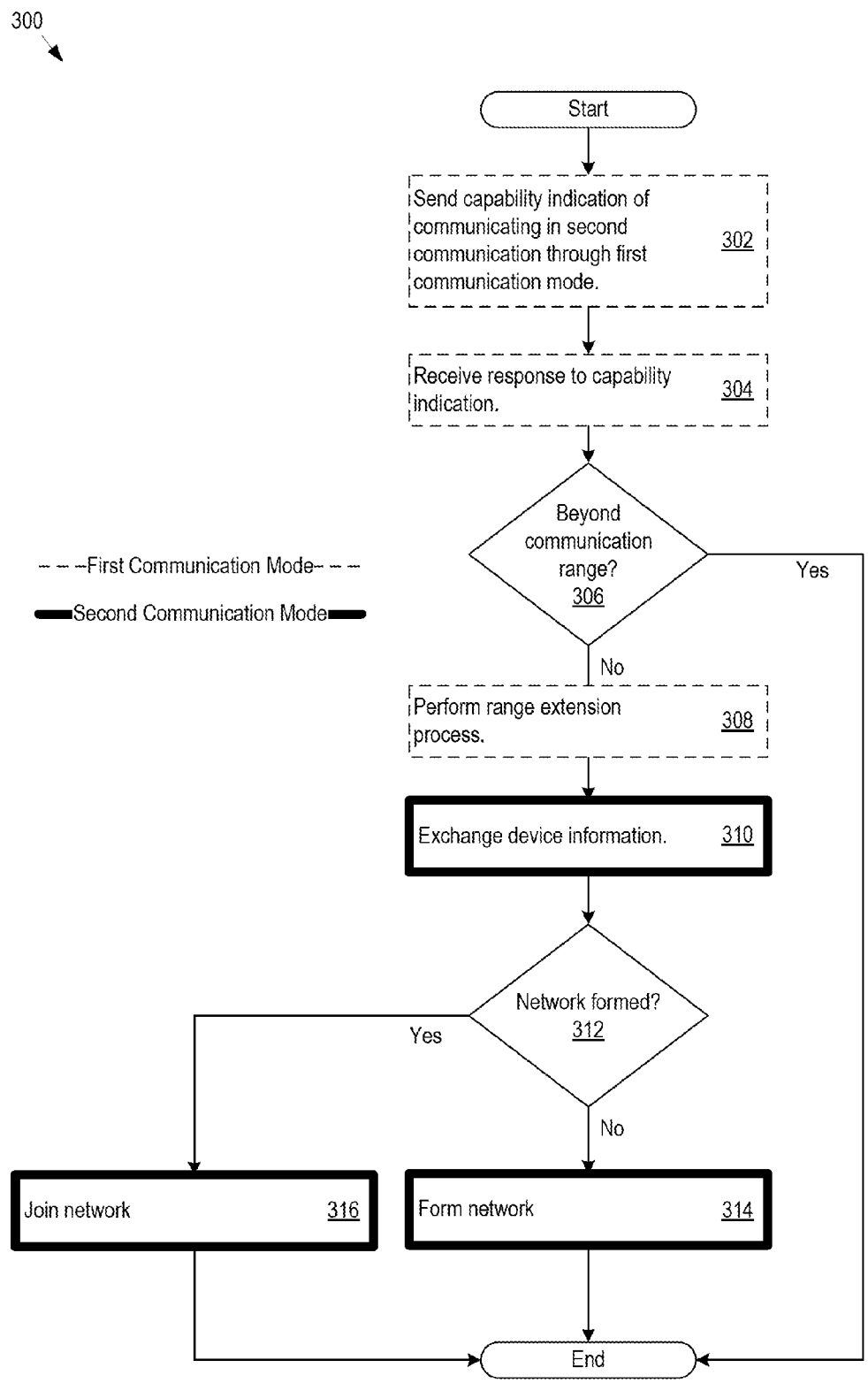
FIG. 3 shows an example of logic that the electronic device may implement to perform assisted device discovery.

FIG. 3 shows an example of logic 300 that the electronic device 100 may implement to perform assisted device discovery. The electronic device 100 may implement the logic 300 in hardware, software, firmware, or combination thereof. For example, the system logic 114 may implement the logic 300 in software as the discovery instructions 132.

The system logic 114 sends a capability indication through a first communication mode (302). The capability indication indicates the electronic device 100 is capable of communicating in a second communication mode, e.g., according to a second communication standard or protocol. Sending the capability indication through the first communication mode may include sending the capability indication according to a first communication protocol, standard, or technique. As one example, the system logic 114 may send, advertise, or broadcast a beacon message through the first communication mode. The beacon message may include the capability indication to signal to receiving devices that the electronic device 100 is capable of communicating in the second communication mode.

The system logic 114 may determine, e.g., select, to send the capability indication in the first communication mode because the first communication mode has a greater communication range than a device discovery range (or initial communication range) of the second communication mode. The device discovery range (or initial communication range) of the second communication mode may be extended through one or more range extension processes or processes, such as beamforming. The system logic 114 may determine to send the capability indication in the first communication mode because the first communication mode has a greater communication range than the extended communication range of the second communication mode.

The system logic 114 may send the capability indication to devices that are (i) positioned within the device discovery range of the second communication mode; (ii) outside the device discovery range of the second communication mode but within the extended communication range of the second communication mode; and (iii) outside the extended communication range of the second communication mode but within the communication range of the first communication mode. Accordingly, the system logic 114 may advertise the capability of the electronic device 100 to communicate in the second communication mode at a greater range than the device discovery range of the second communication mode, and thus discover other devices capable of communicating in the second communication mode outside the device discovery range of the second communication mode.

The system logic 114 discovers another, e.g., different, electronic device also capable of communicating in the second communication mode. In some implementations, the system logic 114 discovers the different electronic device by receiving a beaconing message or capability indication from the different electronic device indicating the different electronic device is capable of communicating in the second communication mode. Alternatively or additionally, the system logic 114 may receive a response to the previously sent capability indication (304). As some examples, the system logic 114 may receive an acknowledgement message from the different electronic device or an initiation message from the different electronic device for communicating in the second communication mode. In some implementations, the system logic 114 determines or identifies a response to the capability indication when the second electronic device initiates a range extension process, e.g., through a beamforming sector sweep or other beamforming communication. In response, the system logic 114 may perform a range extension process with the different electronic device (308) for the second communication mode to communicate, e.g., at an extended range in the second communication mode.

The system logic 114 determines whether the different electronic device is positioned beyond a communication range of the second communication mode (306). In that regard, the system logic 114 may determine when the different electronic device is positioned beyond the extended communication range of the second communication mode. As one illustrative example, after discovering a different electronic device capable of communicating according to 802.11ad wireless communications, the system logic 114 may determine the different electronic device is positioned outside of an extended 802.11ad communication range of the system logic 114 when a beamforming process is performed with the different electronic device.

The system logic 114 may determine the different electronic device is positioned outside of a communication range of the second communication mode in various ways. As one example, the system logic 114 may measure a received signal strength indication (RSSI) from communications received from the different electronic device, including a response message to a capability indication, range extension communications (e.g., beamforming sector sweep or beam refinement protocol communications), and more. Accordingly, the system logic 114 may determine when the different electronic device is outside of, for example, an extended communication range of the second communication mode before, during, or after performing the range extension process. The system logic 114 may utilize the RSSI data to determine or estimate a distance range of the different electronic device to determine when the different electronic device is out of range. Additionally or alternatively, the system logic 114 may determine when the different electronic device is out of a communication range of the second communication mode when the RSSI data of received communications from the different electronic device is less than a particular RSSI threshold value. As another example, the system logic 114 may receive positioning data with respect to the different electronic device, e.g., Global Position Service (GPS) position data or other position data. Any number of configuration or range determination parameters may be specified in the discovery parameter 134. The system logic 114 may prevent, e.g., abort, a communication attempt with the different electronic device in the second communication mode when the different electronic device is outside of the extended communication range of the second communication mode.

The system logic 114 may discover the different electronic device or perform a range extension process for the second communication mode by communicating with the different electronic device in the first communication mode. At some point, the system logic 114 begins communication with the different electronic device in the second communication mode, e.g., after performing a range extension process with the different electronic device. Then, the system logic 114 may exchange device information with the different electronic device (310), which may include sending a probe or capability inquiry communication to the different electronic device and receiving a response. In some implementations, the system logic 114 or the different electronic device may send a beaconing message in the second communication mode, for example.

The system logic 114 may determine whether a network was previously formed (312). In that regard, the system logic 114 may determine whether the system logic 114 has joined a previously formed network. If so, the system logic 114 may send a network indication to the different electronic device indicating the system logic 114 is part of a previously formed network. The system logic 114 may additionally or alternatively determine whether the different electronic device is part of or joined to a previously formed network, e.g., based on the device information received from the different electronic device. When no network was previously formed, the system logic 114 and the different electronic device may form a network (314), e.g., an ad-hoc, base service set, or peer to peer network. When forming the network, the system logic 114 and/or the different electronic device may determine which of the devices will act as a control or administrative entity, e.g., handling joining and leaving of the network, sending beaconing messages, etc. When the system logic 114 determines that a previously formed network exists, one or both of the system logic 114 and the different electronic device may join the previously formed network.

In FIG. 3, the system logic 114 performs some of the exemplary communications in the first communication mode and some exemplary communications in the second communication mode. However, any number of variations are possible.

Figure 4:
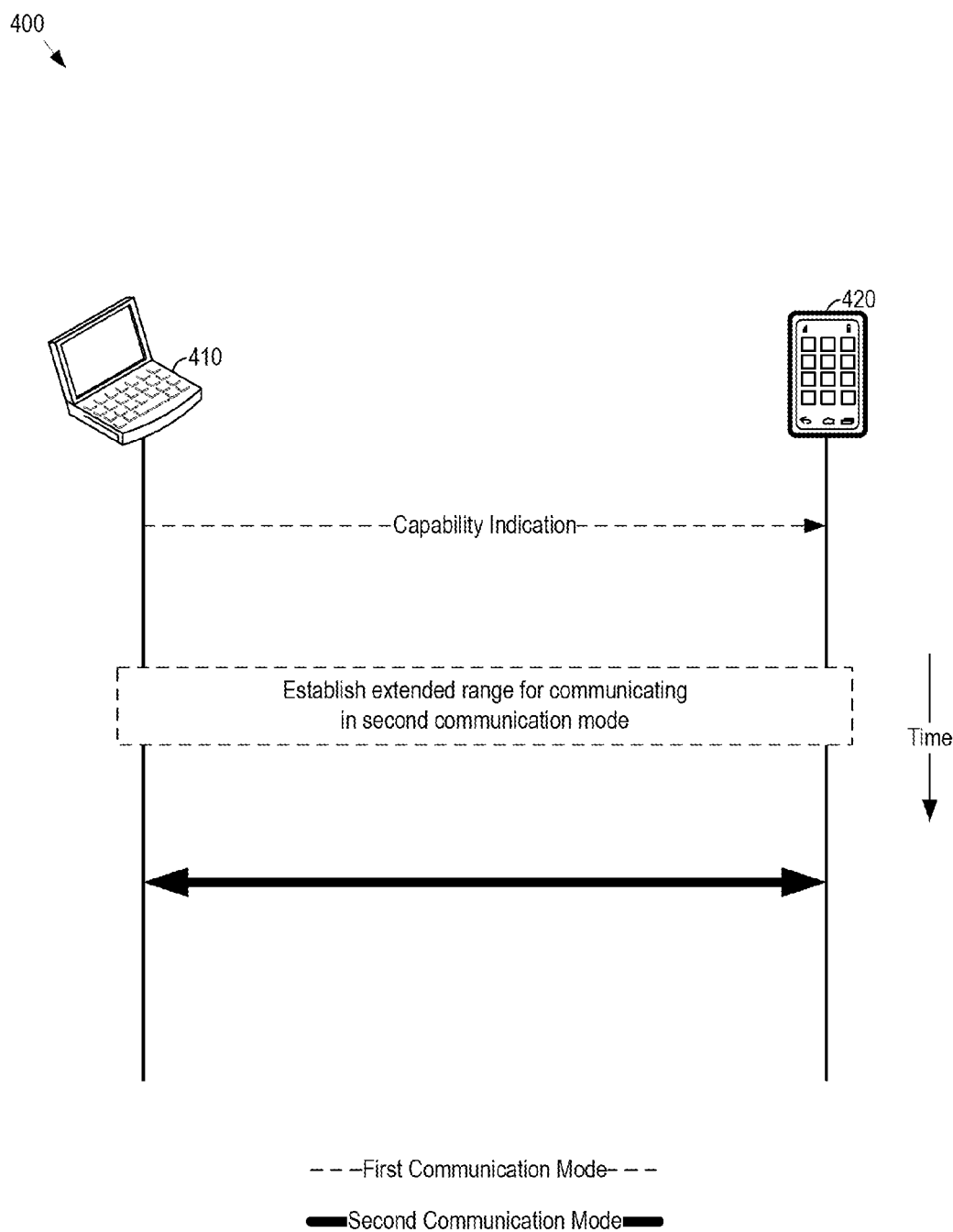
FIG. 4 shows an exemplary communication exchange between a first electronic device and a second electronic device.

FIG. 4 shows an exemplary communication exchange 400 between a first electronic device 410 and a second electronic device 420. The first electronic device 410 and second electronic device 420 may communicate in a first communication mode and a second communication mode. The first and second electronic devices 410 and 420 may perform assisted device discovery using the first communication mode for device discovery and range extension for communicating in the second communication mode.

In FIG. 4, the first electronic device 410 sends a capability indication to the second electronic device 420. The first electronic device 410 sends the capability indication in the first communication mode, e.g., through a first communication interface adapted to communicate across a first communication standard. The capability indication may be a beacon message that includes an IE indicating the first electronic device 410 supports communications in the second communication mode, e.g., communications across a second communication standard different from the first communication standard. The capability indication may be a custom message sent by the first electronic device 410 advertising the communication capabilities of the first communication device, sent through a control channel for example.

After receiving the capability indication, the second electronic device 420 may respond to the first electronic device 410 with an indication that the second electronic device 420 supports communications in the second communication mode. The second electronic device 420 may respond by sending a response communication in the first communication mode. For instance, the second electronic device 420 may send an acknowledgement or response message to the first electronic device 420 in the first communication mode. As another example, the second electronic device 420 may initiate a range extension process for the second communication mode, such as initiating a beamforming process with the first electronic device 410. Accordingly, the first and second electronic devices 410 and 420 may discover one another and then establish an extended range for communicating in the second communication mode. After completion of the range extension process, the first and second electronic devices 410 and 420 may communicate in the second communication mode, up to an extended range of the second communication mode.

802.11a/b/q/n and 802.11ad Example

One particular example of assisted device discovery is presented next through FIGS. 5-9. Specifically, the example relates to assisted discovery of 802.11ad capable devices. Communication according to the 802.11ad standard operates in the 60 GHz frequency band, which has much more spectrum available than the 2.4 GHz and 5 GHz bands, allowing for wider channels that support faster transmission speeds. Use of the 60 GHz band allows extremely fast communication, but also presents the challenge that propagation loss is higher than in the 2.4 GHz and 5 GHz bands. Transmission at 60 GHz may cover less distance for a given power, mainly due to the increased free space path loss, which may include 68 dB losses over 1 meter at 60 GHz and may be 21.6 dB worse than at 5 GHz. Space path losses at 60 GHz may be compounded by propagation losses through materials and human body shadowing (losses from a few dB to 30 dB or more). Thus, the device discovery range of 802.11ad may be lesser than the device discover range of other wireless communication standards, protocols and/or modes, such as standards operating in the 2.4 GHz and 5.0 GHz band. As mentioned above, the 802.11ad standard specification supports beamforming, which allows for an extended 802.11ad communication range after discovery of 802.11ad capable devices.

In this example, electronic devices communicate in a first communication mode through sending communications across the 2.4 GHz and/or 5.0 GHz bands in accordance with any of the 802.11a, b, g, and/or n wireless standards (referred to as 802.11 a/b/g/n). The electronic devices utilize the 802.11 a/b/g/n communications to extend a device discovery range of devices capable of communicating across the 60 GHz band according to the 802.11ad standard. This extended 802.11ad device discovery range may extend beyond the 802.11ad communication range, even after extending the communication range through beamforming. While the following example is presented within the context of 802.11a/b/g/n assisted 802.11ad device discovery, the electronic device 100 or system logic 114 may apply consistent methods and techniques for performing assisted device discovery with any number of varying first and second communication modes.

Figure 5:
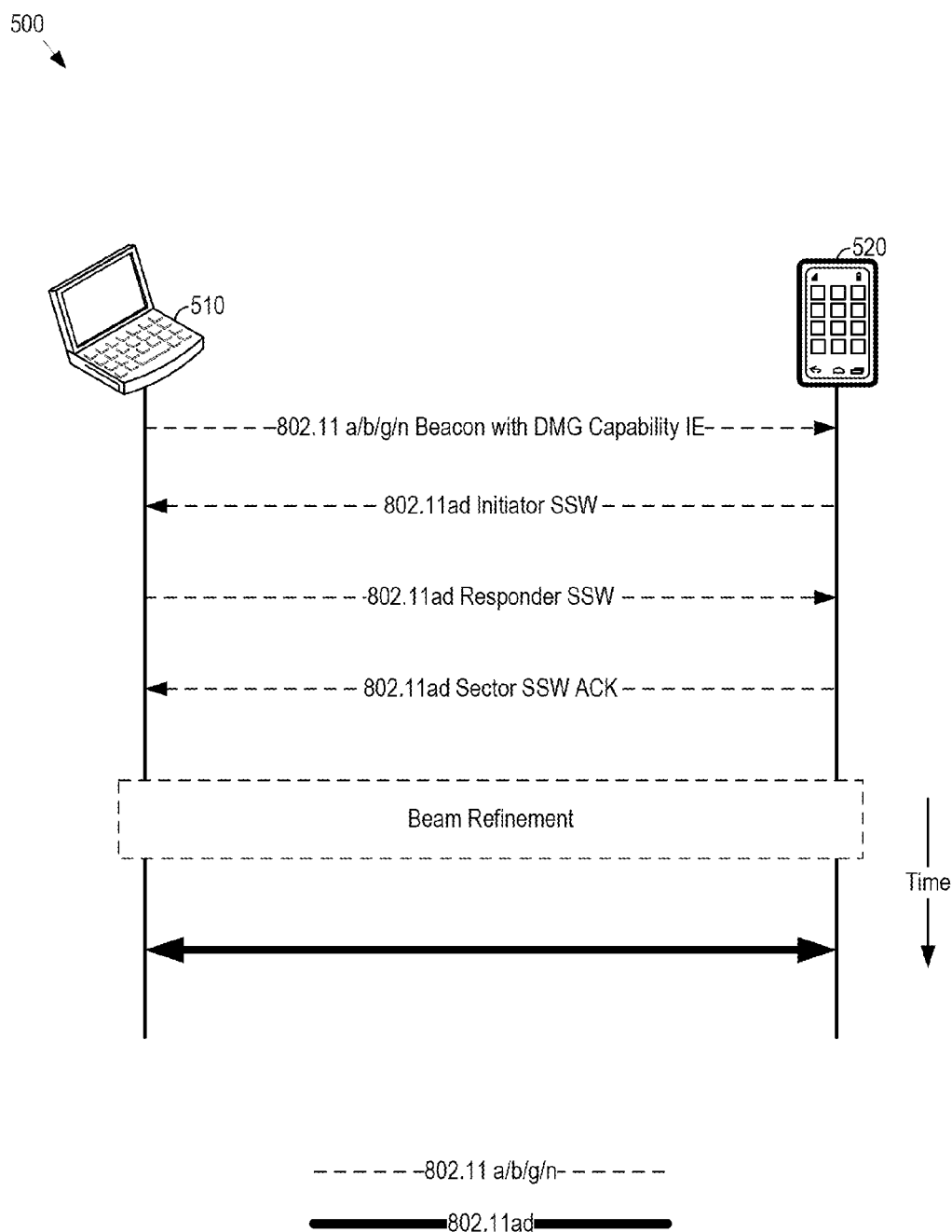
FIG. 5 shows an exemplary communication exchange between a first electronic device and a second electronic device 520 for performing assisted device discovery.

FIG. 5 shows an exemplary communication exchange 500 between a first electronic device 510 and a second electronic device 520 for performing assisted device discovery. In the example shown in FIG. 5, the first and second communication devices 510 and 520 perform 802.11 a/b/g/n assisted 802.11ad discovery, though similar or consistent techniques and methods may be used to perform first communication mode assisted second communication mode device discovery. The electronic devices may also be referred to as stations (STA).

The electronic device 510 sends an 802.11 a/b/g/n beacon. The electronic device 510 sends the 802.11 a/b/g/n beacon through a communication interface adapted to communicate in the 2.4 GHz or 5.0 GHz band, e.g., through a 2.4/5 GHz control PHY. The first electronic device 510 may send the 802.11 a/b/g/n beacon to discover other 802.11 a/b/g/n capable devices, and additionally or alternatively add a 802.11ad capability indication in the 802.11 a/b/g/n beacon. Other electronic devices that receive the 802.11 a/b/g/n beacon with the 802.11ad capability indication from the first electronic device 510 may recognize that the first electronic device 510 is capable of communicating the 60 GHz band according to the 802.11ad standard. The format of beacon messages, including an 802.11 a/b/g/n beacon, may include custom or open data fields that the transmitting electronic device may populate. The first electronic device 510 may add the 802.11ad capability indication in one of these custom or open data fields.

One example of a capability indication the first electronic device 510 may include in a beacon message is a Directional MultiGigabit (DMG) STA Capabilities Information Element. The DMG STA capability IE may provide information representing the capabilities of the transmitting STA (e.g., the first electronic device 510). Upon receiving a beacon message which includes the DMG STA capability IE, the second electronic device 520 may recognize the first electronic device 510 is 60 GHz capable. One format of a DMG STA capability IE is defined in the 802.11ad specification, incorporated by reference herein it is entirety.

By sending the 802.11 a/b/g/n beacon with DMG capability IE in an 802.11 a/b/g/n communication, the first electronic device 510 may advertise its 802.11ad capability at a greater range than the 60 GHz communication range for sending discovery communications, e.g., 802.11ad beacons, in an 802.11ad communication.

The second electronic device 520 may respond to the first electronic device 510 after receiving the 802.11 a/b/g/n beacon with DMG capability IE from the first electronic device 510. In FIG. 5, the second electronic device 520 initiates a beamforming training process for performing 802.11ad communications with the first electronic device 510 at an extended range. The first and second electronic devices 510 and 520 may perform beamforming training by exchanging a bidirectional sequence of beamforming training frame transmissions that uses sector sweep and provides the signaling to allow each STA to determine appropriate antenna system settings for transmission, reception, or both. A beamforming training frame may include a sector sweep (SSW) frame, a DMG Beacon frame or a beam refinement protocol (BRP) frame. In some implementations, the second electronic device 520 initiates the beamforming process immediately after receiving the 802.11 a/b/g/n beacon, e.g., a short interface space (SIF) amount of time after receiving the beacon.

The electronic devices 510 and 520 perform beamforming training using 802.11a/b/g/n communications. In FIG. 5, the STA receiving the 802.11 a/b/g/n beacon with DMG capability IE (i.e., the second electronic device 520) sends an 802.11ad initiator SSW and the first electronic device 510 responds with an 802.11ad responder SSW. Next, the second electronic device 520 sends a sector sweep feedback message or acknowledgement message, shown in FIG. 5 as the 802.11ad Sector SSW ACK. The first electronic device 510 may similarly send a sector sweep feedback or acknowledgment message.

After exchanging sector sweeps, the first and second electronic devices 510 and 520 may perform a beam refinement process, which may involve exchanging one or more BRP frames to refine the beam between to the devices. The first and second electronic devices 510 and 520 perform beam refinement at a range beyond the 802.11ad device discovery range, e.g., by exchanging BRP frames using 802.11 a/b/g/n communications over a 2.4 GHz/5 GHz control PHY. Thus, the electronic devices 510 and 520 achieve the beam forming and beam refinement at a range greater than the 60 GHz or 802.11ad device discovery range.

Upon forming the beam, the first communication device 510 and second communication device 520 may begin 802.11ad communications. For example, the devices may exchange beacon frames, management frames, and/or data frames, which may be used in network initialization or joining an existing network. For example, the electronic devices 510 or 520 may be an access point, control entity, or other administrative entity or implement network administration or control functions for a particular communication network. Examples of networks may include bridged networks, peer-to-peer networks, ad-hoc networks, and more. The electronic devices may exchange management communications for initializing or joining any type of network. Another example of a network is a basic service set, such as personal base service set (PBSS). The PBSS may or may not include an access point, through which member electronic devices of the PBSS may access, for example, other basic service sets or communication networks (e.g., the Internet). The PBSS includes a personal BSS control point (PCP), which may perform various control or management functions for the PBSS.

FIGS. 6-9 provide various communication exchanges and techniques through which the first and second electronic devices 510 and 520 may indicate the existence of previously formed network, e.g., PBSS, initialize a PBSS, or join a PBSS. The system logic 114 may apply additional or alternative techniques and methods for determining the existence of, forming, or joining other types of networks as well.

Figure 6:
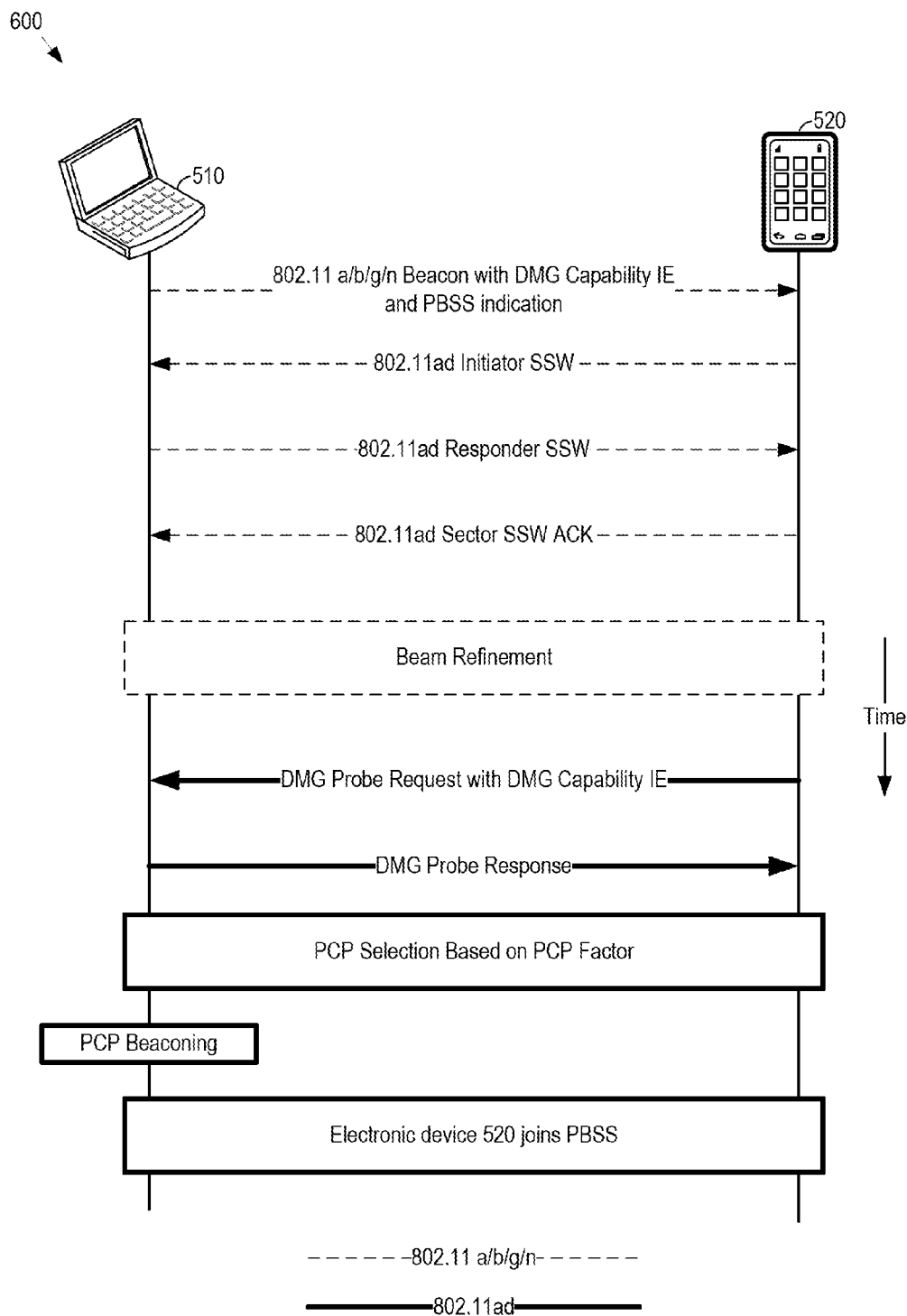
FIG. 6 shows an exemplary communication exchange between the first electronic device and the second electronic device for performing assisted device discovery when a network is not formed.

FIG. 6 shows an exemplary communication exchange 600 between the first electronic device 510 and the second electronic device 520 for performing assisted device discovery when a network (e.g., base service set or PBSS) is not formed. In some implementations, the beaconing electronic device may include a network indication in the beacon. The network indication may indicate whether the beaconing electronic device is part of, a member of, or has previously joined to a network or particular type of network, such as an 802.11ad network or an 802.11ad PBSS. The beaconing electronic device may configure the beacon to be protocol specific. For example, the beaconing electronic device may send an 802.1 a/b/g/n beacon indicating whether the beaconing electronic device is part of an already formed network or not. An 802.11ad beacon may include similar indication information. An 802.11a/b/g/n beacon may additionally indicate whether an 802.11ad network is already formed or not, as described herein.

The network indication may be implemented as, for example, a vendor or manufacturer specific information element. Some formats for a vendor specific IE are provided in the 802.11 a/b/g/n/ac/ad specifications. One exemplary format for a vendor specific IE is as follows:

{Element ID; Length; Organization Identifier; Network indication}

The network indication may be a single bit, where one bit indicates the beaconing or sending electronic device is part of, a member, or has previously joined a network. For example, the network indication may be specified as a discovery mode field, which a PCP of a PBSS may set to 0 (e.g., in an 802.11ad beacon) to indicate a PBSS exists or was previously formed.

An electronic device may receive a beacon of a first communication mode with a network indication for a second communication mode. Accordingly, the electronic device receiving the beacon can determine if the beaconing electronic device is part of a network of the second communication mode or not. In the FIG. 6, the first electronic device 510 sends an 802.11 a/b/g/n beacon that includes a 802.11ad PBSS indication through an 802.11 a/b/g/n communication. In FIG. 6, the 802.11 PBSS indication is implemented as a vendor specific IE and indicates that the first electronic device 510 is not part of a PBSS (e.g., discovery mode=0). The first and second electronic devices 510 and 520 may perform a beamforming process to establish a beam and extend the 802.11ad communication range between the two devices, for example as described above. Upon forming the beam, the first and second electronic devices 510 and 520 may exchange 802.11ad communications.

The first and second electronic devices 510 and 520 may form a network, such as a PBSS. To form the PBSS or determine a PCP for the PBSS, the devices may exchange device information. The device information may include any number of characteristics or information of the first electronic device 510 and the second electronic device 520 respectively. In FIG. 6, the second electronic device 520 is not part of a PBSS and determines, based on receiving the 802.11 a/b/g/n beacon from the first electronic device 510, that the first electronic device 510 is not part of a PBSS as well. Thus, the second electronic device 520 may determine that a PBSS has not yet been formed. In response, the second electronic device 520 (e.g., the non-beaconing electronic device) may initiate a PCP selection process.

The second electronic device 520 sends a probe request to the first electronic device 520. The probe request may specify the 802.11ad capabilities of the second electronic device 520, for example through an attached DMG capability IE. Thus, the first and second electronic devices 510 and 520 may be aware of one another's capabilities for a particular communication mode. The first electronic device 510 may send a DMG probe response to the DMG probe request from the second electronic device 520.

The first and second electronic devices 510 and 520 may perform a PCP selection process to determine a PCP for the PBSS being formed. As one example, the PCP selection process may be performed by comparing the PCP factor of the electronic devices 510 and 520, which may be indicated in the DMG capability IE. That is, the first electronic device 510 may access or determine its own PCP factor and obtain the PCP factor of the second electronic device 520 from the DMG capability IE sent from the second electronic device 520. Then, by comparing the two, the first electronic device 510 may determine the PCP for the PBSS from among the first and second electronic devices 510 and 520. The second electronic device 520 may perform a similar PCP factor comparison. In FIG. 6, the first and second electronic devices 510 and 520 determine the first electronic device 510 as the PCP for the newly formed PBSS. Accordingly, the first electronic device 510 assumes the role of PCP and begins sending 802.11ad PCP beacons, e.g., through the 802.11ad control PHY of the first electronic device 510. Then, the second electronic device 520 exchanges 802.11ad communications with the first electronic device 510 to join the newly formed PBSS.

Figure 7:
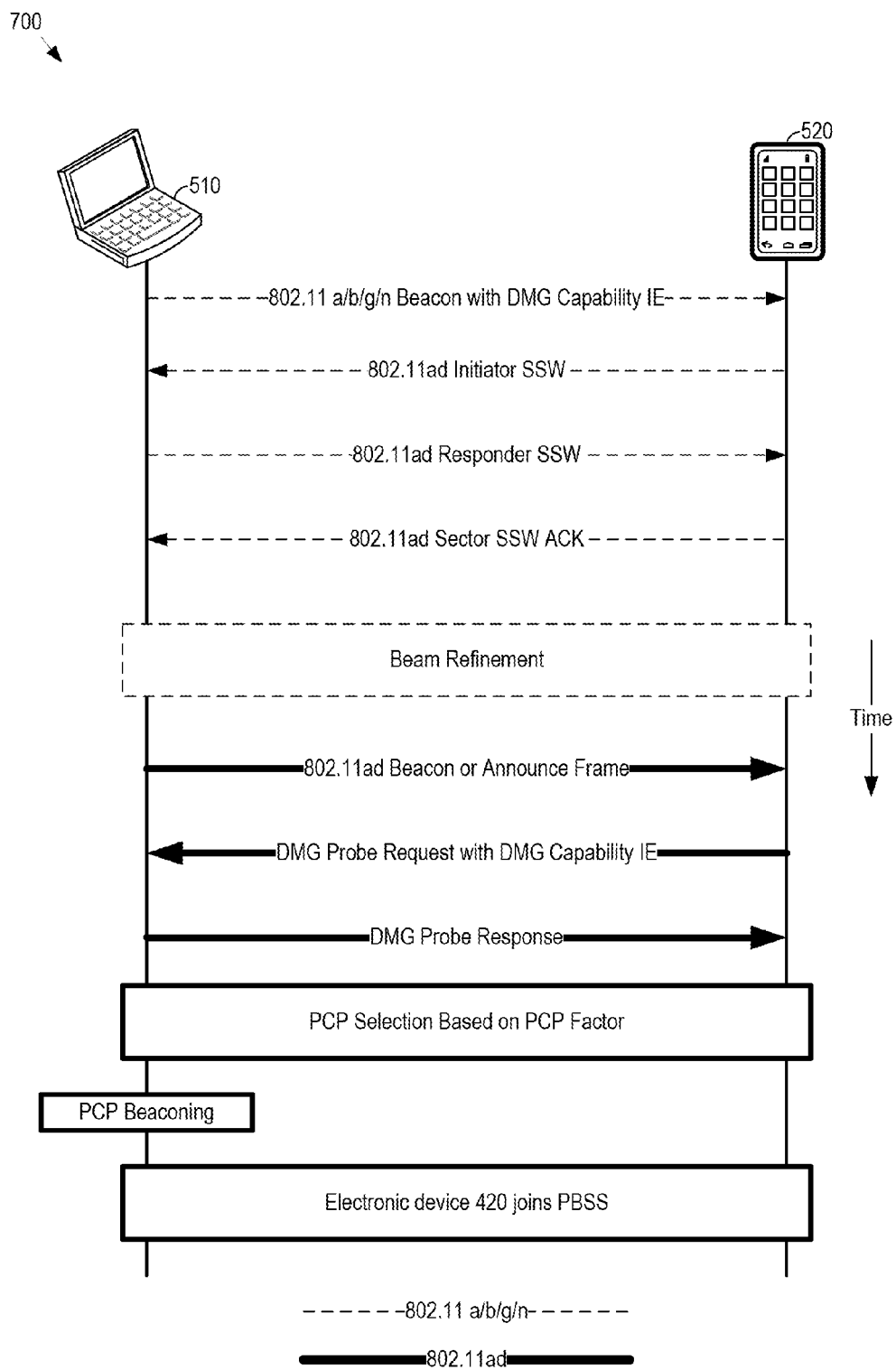
FIG. 7 shows another exemplary communication exchange between the first electronic device and the second electronic device for performing assisted device discovery when a network is not formed.

FIG. 7 shows another exemplary communication exchange 700 between the first electronic device 510 and the second electronic device 520 for performing assisted device discovery when a network (e.g., base service set or PBSS) is not formed. In FIG. 7, the first electronic device 510 sends a 802.11 a/b/g/n beacon, which is received by the second electronic device 520. The first electronic device 510 foregoes transmitting a network indication with the 802.11 a/b/g/n beacon. That is, the first electronic device 510 may not include a 802.11ad network indication, such as a vendor specific IE, with its beaconing messages sent through 802.11 a/b/g/n communications. Accordingly, after performing the beamforming process, the first electronic device 510 may be unaware of whether the second electronic device 520 is part of a previously formed PBSS (e.g., an 802.11ad network) and similarly the second electronic device 520 may be unaware of whether the first electronic device 510 is part of a previously formed PBSS.

In some implementations, the beaconing electronic device may send a network indication in a second communication mode after a range extension process completes in the first communication mode. In FIG. 7, after completing the beamforming process, the first electronic device 510 (beaconing device) sends an 802.11ad network indication to the second electronic device 520 (non-beaconing device) in the form of an 802.11ad beacon or announce frame. The 802.11ad beacon or announce frame may indicate to the second electronic device 520 whether the first electronic device 510 is part of a previously formed PBSS. In FIG. 7, the second electronic device 520 determines, through the received 802.11ad announce frame or beacon, that the first electronic device 510 is not part of a previously formed PBSS. Accordingly, the second electronic device 520 sends a probe request with an attached DMG capability IE. The first electronic device 520 may respond with a DMG probe response and may additionally or alternatively include a DMG capability IE as well. Then, the electronic devices 510 and 520 determine a PCP for the newly formed PBSS. The PCP, e.g., the first electronic device 510 in FIG. 7, may then send 802.11ad beacons. The non-PCP device, e.g., the second electronic device 520 in FIG. 7, may join the newly formed PBSS.

Figure 8:
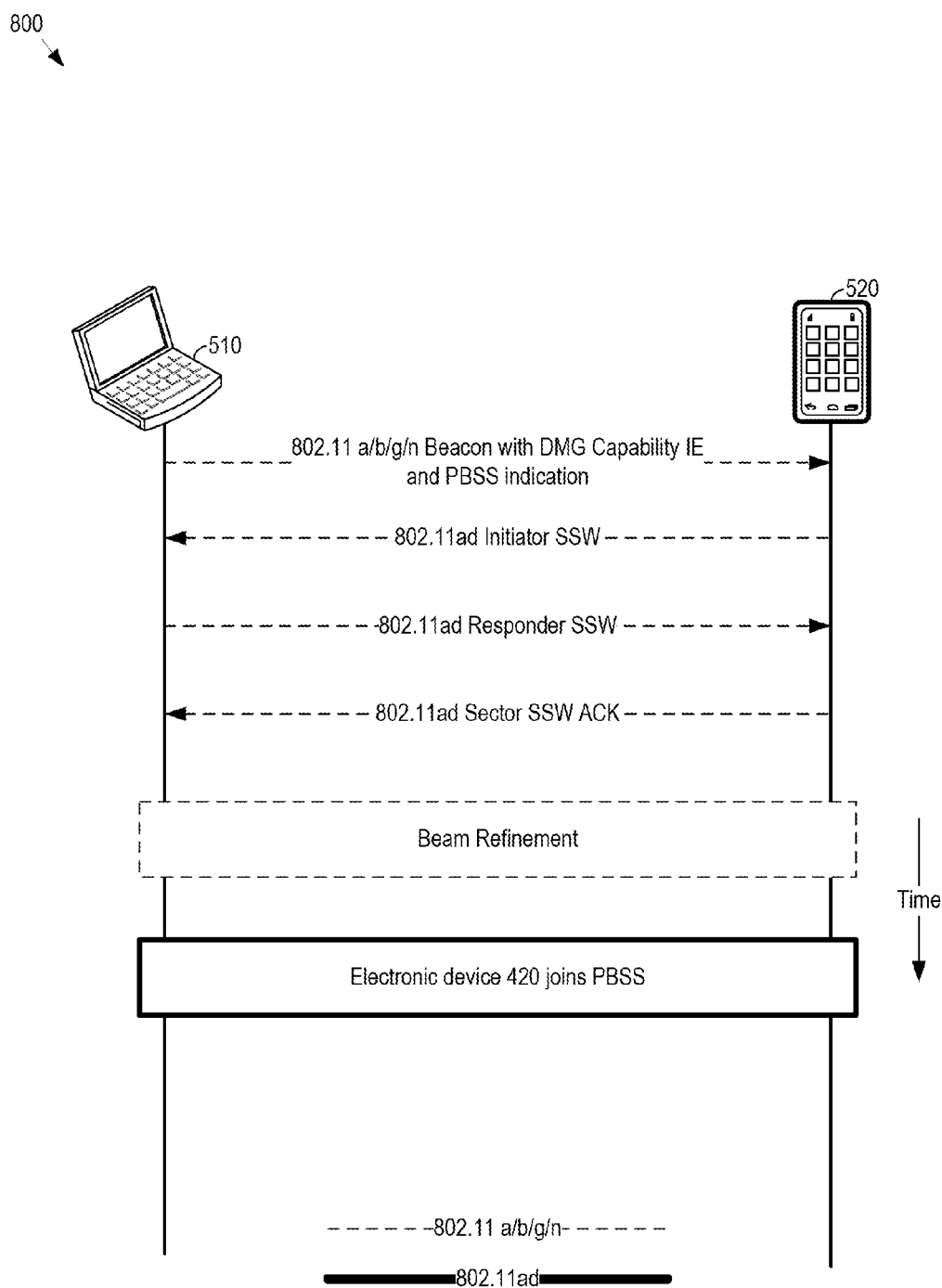
FIG. 8 shows an exemplary communication exchange between the first electronic device and the second electronic device for performing assisted device discovery when a network is formed.

FIG. 8 shows an exemplary communication exchange 800 between the first electronic device 510 and the second electronic device 520 for performing assisted device discovery when a network (e.g., base service set or PBSS) is formed. In FIG. 8, the first electronic device 510 is a PCP for a previously formed PBSS and sends 802.11 a/b/g/n beacons with a DMB capability IE and a 802.11ad network indication, e.g., a PBSS indication specified through a discovery mode field. The first electronic device 510, as a PCP, sets the value of the discovery mode field to 0 to indicate the existence of a previously formed PBSS. Accordingly, in response to receiving the 802.11 a/b/g/n beacon message with the PBSS indication, the second electronic device 520 recognizes the existence of the PBSS. After performing a beamforming process, the second electronic device 520 exchanges 802.11ad communications with the first electronic device 510 to join the PBSS for which the first electronic device is the PCP.

Figure 9:
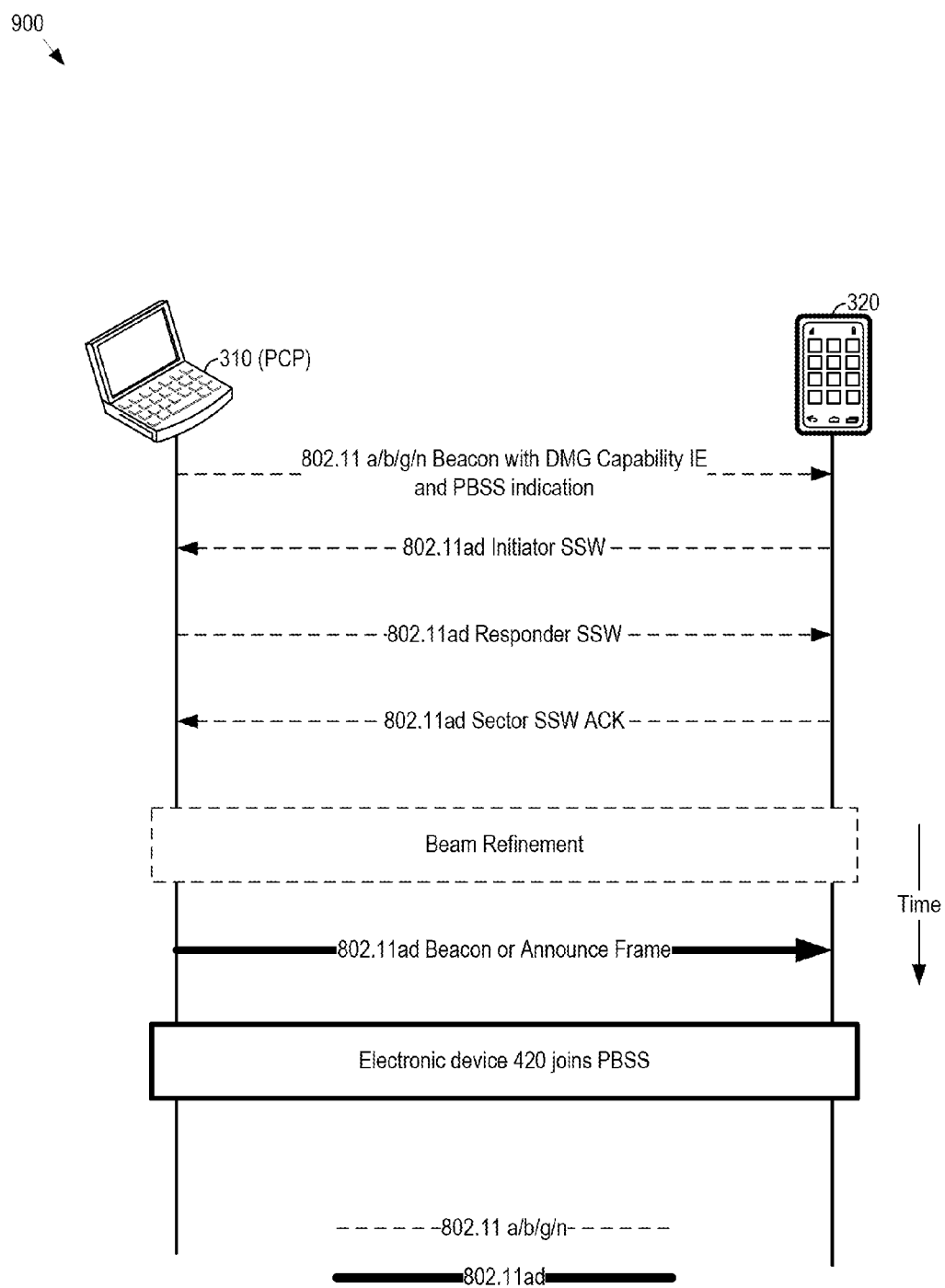
FIG. 9 shows another exemplary communication exchange between the first electronic device and the second electronic device for performing assisted device discovery when a network is formed.

FIG. 9 shows another exemplary communication exchange 900 between the first electronic device 510 and the second electronic device 520 for performing assisted device discovery when a network (e.g., base service set or PBSS) is formed. In FIG. 9, the first electronic device 510 is a PCP for a previously formed PBSS and sends 802.11 a/b/g/n beacons with a DMB capability IE, but without a 802.11ad network indication, e.g., without a PBSS indication. After beamforming, the PCP (e.g., the first electronic device 510) indicates the existence of a previously formed PBSS to the non-beaconing device (e.g., the second electronic device 520). In some implementations, the first electronic device 510 sends an 802.11ad beacon or announce frame, which may indicate the existence of the previously formed PBSS through the discovery mode field. In response to receiving the 802.11ad beacon or announce frame, the second electronic device 520 determines the existence of the previously formed PBSS and exchanges 802.11ad communications with the first electronic device 510 to join the PBSS for which the first electronic device is the PCP.

The first electronic device 510 may send beacons according to multiple communication modes. For example, when acting as the PCP for a 802.11ad PBSS, the first electronic device 510 may send 802.11ad beacons and 802.11 a/g/b/n beacons. Within a beacon interval for the 802.11ad PBSS, the PCP may for example, allocate a particular amount of time for sending 802.11 a/b/g/n beacons. The allocated amount of time may be sufficient in duration to complete transmission of a beacon frame and perform beamforming with 802.11ad capable devices discovered through the 802.11 a/b/g/n beacon, for example. In some implementations, the PCP sends 802.11ad beacons at a predetermined rate, for example as specified according to the discovery parameters 134. The rate may specify the PCP sending 802.11 a/b/g/n beacons once every two beacon intervals, once every three beacon intervals, etc.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method comprising:
    receiving, with a first communication device, a capability information message of a second communication device, the capability information message being in a first communication protocol, and being indicative of capability of the second communication device to communicate in a second communication protocol with a lesser communication range than the first communication protocol, the first communication device being positioned apart from the second communication device by greater than the lesser communication range;
    forming, by the first communication device, a beam with the second communication device using the first communication protocol, the beam formed to extend a communication range of the second communication protocol between the first communication device and the second communication device, the communication range being extended beyond the lesser communication range; and
    communicating, by the first communication device, with the second communication device over the beam using the second communication protocol.

2. The method of claim 1, wherein forming the beam comprises exchanging, by the first communication device, device information with the second communication device over the first communication protocol.

3. The method of claim 1, wherein the communicating, by the first communication device, with the second communication device over the beam using the second communication protocol comprises establishing, by the first communication device, a network with the second communication device.

4. The method of claim 3, further comprising initiating, by the first communication device, a network control point by comparison of a control point of the first communication device with a control point of the second communication device to establish the network control point as being either the control point of the first communication device or the control point of the second communication device.

5. The method of claim 1, wherein the communicating, by the first communication device, with the second communication device over the beam using the second communication protocol comprises joining, by the first communication device, an established network that includes the second communication device.

6. The method of claim 5, further comprising joining, by the first communication device, the established network as a non-control point device since the second communication device is a control point of the established network.

7. The method of claim 1, wherein the forming, by the first communication device, the beam with the second communication device using the first communication protocol comprises transmitting, by the first communication device, a probe request to the second communication device, the probe request being indicative of communication capabilities of the first communication device.

8. The method of claim 7, wherein the probe request is a directional multigigabyte probe response that includes an information element comprising a formed network indication.

9. The method of claim 1, wherein the capability information message of the second communication device is a beacon, and the forming, by the first communication device, a beam with the second communication device using the first communication protocol comprises transmitting, by the first communication device, a capability indication message to the second communication device with the first communication protocol.

10. The method of claim 1, wherein forming, by the first communication device, a beam with the second communication device using the first communication protocol comprises the initial step of initiating a beamforming training process with the first communication device and transmitting, by the first communication device, a beamforming training frame to the second communication device using the first communication protocol.

11. The method of claim 1, wherein the first communication device is positioned beyond a discovery range of the second communication protocol.

12. A communication device comprising:
a first communication interface configured to receive a capability information message of another communication device, the capability information message being communicated in a first communication mode using a first communication protocol, and being indicative of capability of the another communication device to communicate in a second communication mode using a second communication protocol with a lesser communication range than the first communication protocol, the communication device being positioned apart from the another communication device by greater than the lesser communication range;
system logic circuitry configured to use the first communication interface to initiate a communication range extension of the second communication mode; communication circuitry configurable by the system logic circuitry to extend a communication range of the second communication mode between the communication device and the another communication device beyond the lesser communication range to enable communication in the second communication mode; and
a second communication interface configured to communicate with the another communication device using the second communication protocol and the extended communication range of the second communication mode established with the communication circuitry.

13. The communication device of claim 12, wherein the capability information message is a beacon message that includes an indication that the another communication device is, or is not, part of a network operable with the second communication protocol.

14. The communication device of claim 12, wherein the second communication interface is configured to receive an announce frame communicated in the second communication mode from the another communication device, the announce frame including an indication that the another communication device is, or is not, part of a network operable with the second communication protocol.

15. The communication device of claim 13, wherein the system logic circuitry is configured to join the network where the another communication device is part of the network using the second communication mode, and wherein the system logic circuitry is configured to form a new network between the communication device and the another communication device using the second communication mode where the another communication device is not part of an existing network.

16. The communication device of claim 14, wherein the system logic circuitry is configured to join the network where the another communication device is part of the network using the second communication mode, and wherein the system logic circuitry is configured to form a new network between the communication device and the another communication device using the second communication mode where the another communication device is not part of an existing network.

17. A system comprising:
a first communication device; and
a second communication device configured to wirelessly communicate with the first communication device in a first communication mode to determine that the first and the second communication devices can wirelessly communicate in a second communication mode, wherein the second communication mode has a communication range that is less than a range of communication of the first communication mode, and wherein the first communication device and the second communication device are positioned outside the communication range of the second communication mode;
wherein the first and second communication devices are cooperatively configured to extend the communication range of the second communication mode, and exchange messages in the second communication mode over the extended communication range.

18. The system of claim 17, wherein the first communication device and the second communication device form a network in which one of the first communication device and the second communication device are a control point for the network.

19. The system of claim 17, wherein the first communication device is operable in a device discovery mode using the second communication mode and the second communication device is outside a discovery range of the device discovery mode.

20. The system of claim 17, wherein the first communication device is configured to discover the second communication device using the first communication mode, and in response to discovery determine that the second communication device is positioned outside the communication range of the second communication mode.

* * * * *